Aug. 18, 1970    H. MARLOWE    3,524,538
RING PACKAGE
Filed Jan. 21, 1969

INVENTOR
HAROLD MARLOWE
BY
ATTORNEY.

United States Patent Office

3,524,538
Patented Aug. 18, 1970

3,524,538
RING PACKAGE
Harold Marlowe, 192 Clearmeadow Drive,
East Meadow, N.Y. 11554
Filed Jan. 21, 1969, Ser. No. 792,459
Int. Cl. B65d *83/00*
U.S. Cl. 206—56             12 Claims

ABSTRACT OF THE DISCLOSURE

A ring package implementing the manufacture and distribution of endless loop structures such as used for gasketing, drive belts and the like. The package is formed of a flexible material such as a rubber compound which is shaped into a substantially planar sheet, having formed in the sheet a plurality of concentric rings of the desired configuration. Interposed between the rings are formed separating sections with weakened areas whereby the rings may be separated from the sheet, without cutting, by pulling the rings apart from the weakened areas.

BACKGROUND OF THE INVENTION

This invention relates to endless loop structures, and more particularly to an improved package for such structures implementing the production and distribution of loop like articles such as O-rings, gaskets, drive belts, and the like.

With technological advances, and the growth of our economy, more and more different types of mechanical apparatus are being used. Much of this equipment utilizes flexible gasketing, O-rings, and drive belts which deteriorate with time, and must be periodically replaced during the life of any particular piece of equipment. Such replacement gasketing, or drive belt is often difficult to obtain, due to the wide disparity of sizes which are employed. Additionally the problem is further complicated by the fact that given manufacturers of the equipment may not be accessible to the consumer, repairman, or experimenter, either because of geographic location, or the fact that the producer may have gone out of business, or discontinued a particular model, or that the producer is reluctant to fill an order for a small number of gaskets, or drive belts.

As is apparent, with the wide range of possible sizes of such gasketing, or drive belts which may be required, few repairmen, or parts distributors are disposed to maintain in stock every available or necessary size.

As a result there are inconvenient delays in getting equipment repaired, and the cost of repairing a simple defect such as a worn gasket, or broken drive belt may often become prohibitive due to the efforts required to obtain the replacement part.

Additionally, in the past, circular section flexible rings produced from elastomeric compounds, for example, and used as gaskets, O-ring seals, or drive belts, were received by the user in singular form. Such flexible rings were produced in various molds which were constructed in separable mold sections in order to allow removal of the molded part from the mold cavity. Flexible rings produced in such molds are found to have a certain amount of excess material, usually called flash, at the surface of the part which was adjacent to the mold parting line during the molding process. Such excess material remaining as part of the flexible rings, so produced, was found to be objectionable when the ring was used as a seal or gasket or drive belt, as required. Such excess material produced in the molded part, being objectionable, had to be removed by further production processing and necessitated rigid inspection procedures in order to maintain consistent quality rings. These additional processing procedures increased the manufacturing cost of such parts and, in turn, increased the cost to the end user of the parts.

BRIEF SUMMARY OF THE INVENTION

It is with the above considerations in mind, that the present ring package has been evolved to provide a package providing a multiplicity of endless loop structures of a range of sizes substantially extending over the possible gamut of requirements, which package may readily be carried about by the average repairman, or kept in the workshop to provide a selection of replacements for a defective gasket, seal or drive belt, at relatively minimal cost.

It is accordingly a primary object of this invention to provide a package of endless loop structures in which there will be at least one of the loops of the package of a size suitable for the particular repair required.

Another object of the invention is to provide a package of loop structures which may be economically produced and distributed. A further object of the invention is to provide a package containing a wide range of different sized loop structures which may readily be carried about or maintained in a tool kit.

These and other objects of the invention which will become hereafter apparent are achieved by forming a ring package of endless loop structures by molding of the material of which the loop structures are to be formed, such as rubber, any of the synthetic elastomers, or any of the plastics employed for forming gasketing, O-rings, or drive belts. The material is molded with a plurality of concentric loops of the desired shape. Arranged radially between each of the concentric loops is a weakened area in the sheet, whereby said loops may be separated one from the other.

A feature of the invention resides in the formation of the weakened areas of a cross-sectional configuration less in area than that of the cross section of the loops, and with side walls of the weakened areas tapering away from the loops thus implementing separation of the loops from the weakened areas.

Another feature of the ilnvention resides in the formation of projections of the weakened areas serving as a gripping means and implementing separation of a loop, or loops from the multiplicity of loops in said package.

Another feature of the invention resides in the formation of a tearline between the weakened areas and any loop desired to be dispensed which will permit separation of an individual loop from its plural formation with the separated loop having a smooth surface commercially acceptable for immediate use.

BRIEF DESCRIPTION OF THE DRAWING

The specific details of the invention, and their mode of functioning will be particularly pointed out in clear, concise, and exact terms in conjunction with the accompanying drawings wherein.

DESCRIPTION OF THE PREFERRED EMBODIMENTS

Figure 1:
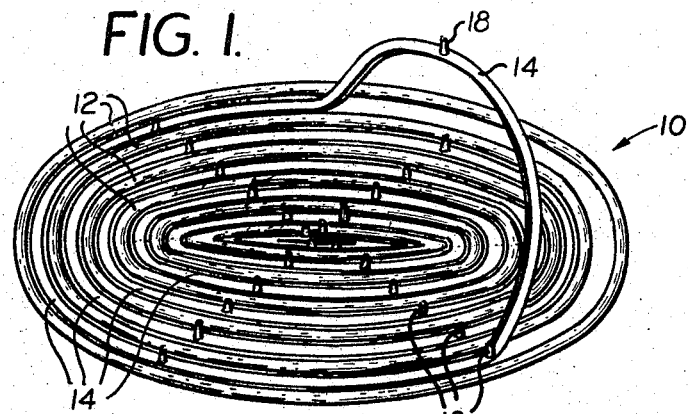
FIG. 1 is a perspective view of the novel package showing one of the weakened areas being removed from the plane of the sheet to separate a desired loop therefrom.

Referring now more particularly to the drawings, like numerals in the various figures will be employed to designate like parts.

As seen in the drawings, the package 10, as illustratively shown provides a plurality of endless circular loops, of circular cross section. It will however, be appreciated by those skilled in the art, that the particular shape of the loop, and its cross section may readily be varied. The sheet of material of which the package 10 is formed is of the type of material of which the desired loops are to be formed. Materials such as rubber, neoprene, or any of the large variety of the synthetic elastomers, plastics, or the like may be employed in forming the sheet.

Formed on the sheet of which the package 10 is constituted are a plurality of concentric loops 12. Between each of the concentric loops 12, a weakened area 14 is provided.

Figure 2:
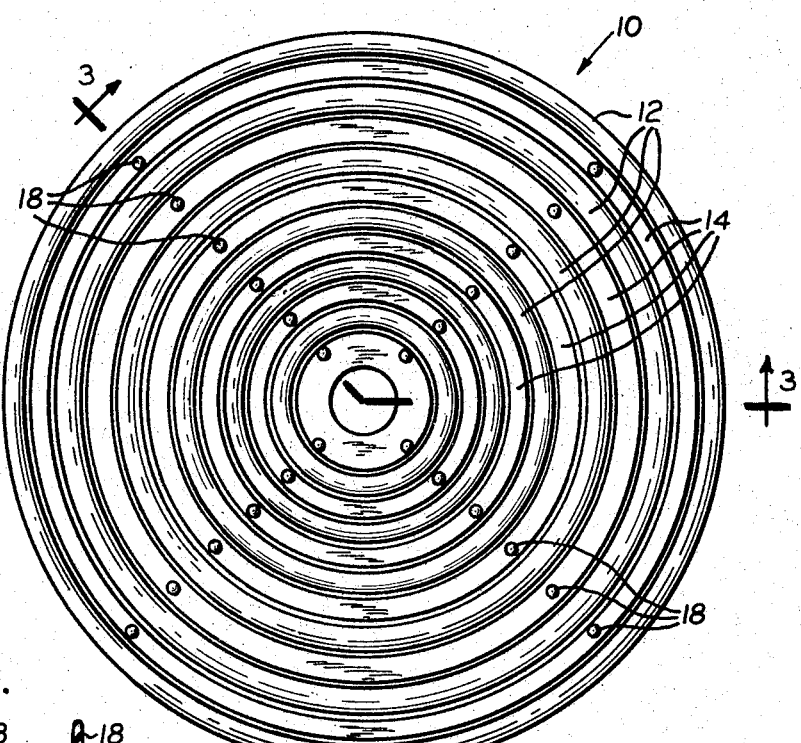
FIG. 2 is a top-plan view of the package.
Figure 3:
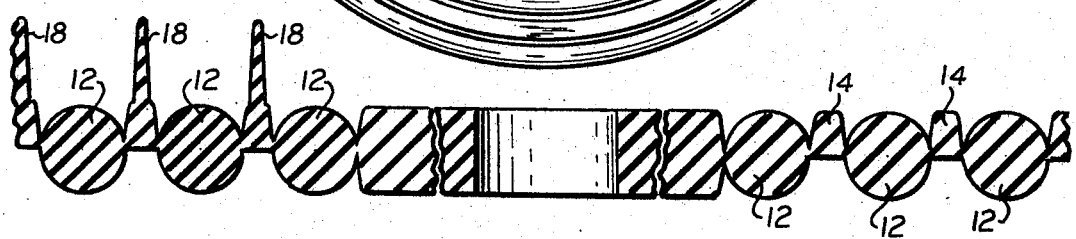
FIG. 3 is an enlarged partial cross section taken on line 3—3 of FIG. 2 illustrating a loop of circular cross-section, and the angling of the walls of the weakened area away from the loops.

According to the illustrated preferred embodiment of the invention shown in FIGS. 1-3, this weakened area is preferably formed with a trapezoidal cross-section as illustrated in FIG. 3. The weakened area 14 is preferably formed by reducing the thickness of this area 14. According to the illustrated embodiment, optimum results have been achieved by forming this weakened area of a thickness half that of the cross-section of the loop, which with a circular cross-section loop results in a joint at the diameter through the cross-section of the loop which implements removal of the weakened area from the loop.

In order to facilitate separation between the weakened area and the loop, a web of between .002 and .009 inch is found desirable in providing a tear kerf so as to produce an acceptably smooth surface on the loop at the line of severance.

In order to implement removal of the weakened area 14 from the sheets so as to separate the loop 12, projections 18 are formed on the weakened area 14 which projections 18 may readily be gripped manually to facilitate the removal of the weakened area. These projections should be thinner in cross section than the cross-section of the loops.

Figure 4:
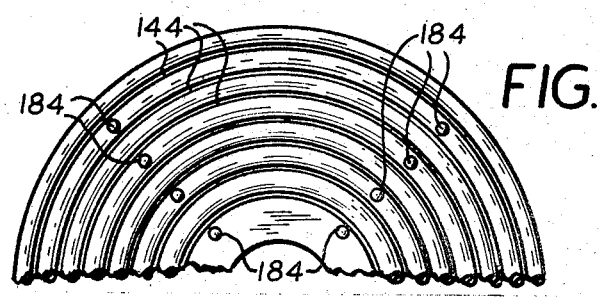
FIG. 4 is a top-plan view of another embodiment of the package formed with substantially contiguous loops separated by a substantially line thickness weakened area.

As shown in FIG. 4, the package may also be formed with the weakened area 144 of substantially line thickness as measured in the plane of the sheet, with a web of between .002 and .009 inch. In this arrangement projections 184 are formed on the loops themselves. Projections 184 are less in thickness than the loops.

OPERATION

In use, the aforedescribed package can readily be fabricated utilizing conventionally available techniques employed in formation of the above described structure.

In forming the illustrated embodiment of the invention, O-rings, gaskets, or circular cross section drive belts of the type used on tape recorders, office machines and the like have been satisfactorily formed by heat molding rubber compounds or compositions into the illustrated package form. The rubber compound, before final curing, is inserted as required into the mold which is heated under pressure to form the package as illustrated.

In use, as is apparent, any desired size ring may be separated from the package by separating the ring from the package along the weakened areas between the selected ring and the package.

Where the projections 18 are arranged on the weakened areas 14 as in FIGS. 1-3, they serve a two-fold function.

On the one hand, the projections implement gripping of the weakened area to remove it from between the loops to be separated from the package. Additionally, the gasket or drive belt to be replaced may be held in position over the package between the projections to make certain that the package ring selected is of proper dimension.

It is thus seen that a simple unitary package containing a wide variety of different sized endless loops may be provided which may readily be carried about in a tool box, or otherwise kept available for use in replacing gasketing, or drive belts, obviating the difficulties previously encountered in obtaining a necessary replacement size.

The above disclosure has been given by way of illustration and elucidation, and not by way of limitation, and it is desired to protect all embodiments of the herein disclosed inventive concept within the scope of the appended claims.

What is claimed is:

1. A ring package implementing the manufacture and distribution of endless loop structures used for gasketing, drive belts, and the like, said package comprising a substantially planar sheet formed of the material of the desired loop structures; a plurality of concentric loops formed on said sheet; and a removable weakened area in said sheets between said loops, whereby said loops may be separated one from the other.

2. A ring package as in claim 1 in which said loops are circular loops.

3. A ring package as in claim 1 in which said weakened area is of a thickness less than that of said loops.

4. A ring package as in claim 3 in which said weakened area is of a thickness such as to permit its removal from the sheet as an integral unit.

5. A ring package as in claim 4 in which said weakened areas may be used to gauge the size of the ring required.

6. A ring package as in claim 1 in which projections extend from the plane of the sheet which projections may be manually engaged to implement separation of said loops from said sheet.

7. A ring package as in claim 6 in which said projections are thinner in cross-section than any cross-sectional dimension of said loops.

8. A ring package as in claim 1 in which said loops are circular in cross-section.

9. A ring package as in claim 8 in which said weakened area is of a thickness transverse to the plane of said sheet equal to half or less than half the cross-sectional diameter of said loops.

10. A ring package as in claim 9 in which said weakened area is of a trapezoidal cross-sectional configuration, with the tapered sides of the trapezoid extending towards each other away from said loops.

11. A ring package as in claim 10 in which the bottom of said trapezoidally contoured weakened area lies on a diametral extension of said loops.

12. A ring package as in claim 11 in which there is a web of between .002 inch and .009 inch between said ring and said trapezoidal portion.

References Cited

UNITED STATES PATENTS 2,985,291   5/1961   Schoepe et al.

JOSEPH R. LECLAIR, Primary Examiner

J. M. CASKIE, Assistant Examiner